United States Patent [19]

Zweekly

[11] 4,335,984
[45] Jun. 22, 1982

[54] METALCUTTING INSERT FOR ROUGHING AND FINISHING

[76] Inventor: Raymond Zweekly, 4625 Sedgemoor, Royal Oak, Mich. 48073

[21] Appl. No.: 204,674
[22] Filed: Nov. 5, 1980
[51] Int. Cl.³ .............................................. B26D 1/00
[52] U.S. Cl. .................................................... 407/114
[58] Field of Search .............................. 407/113, 114

[56] References Cited

U.S. PATENT DOCUMENTS

| | | | |
|---|---|---|---|
| 3,621,549 | 11/1971 | Billups | 407/113 |
| 3,973,308 | 8/1976 | Lundgren | 407/114 |
| 4,059,363 | 11/1977 | Romagnolo | 407/114 |
| 4,065,223 | 12/1977 | Nelson | 407/114 |
| 4,215,957 | 8/1980 | Holma et al. | 407/114 |
| 4,273,480 | 6/1981 | Shivai et al. | 407/114 |

Primary Examiner—Harrison L. Hinson
Attorney, Agent, or Firm—Robert S. Alexander

[57] ABSTRACT

A chipbreaking insert for metalcutting is useful for breaking chips over a wide range of speeds and feeds. In light cuts, the chips are broken by a finishing depression adjacent to the cutting corner. In deeper but still moderate cuts, the chips and broken by a chipbreaking groove which is parallel to the cutting edge. In heavy cuts, the chips are corrugated and deflected away from the workpiece by a series of cylindrical chip deflecting grooves spaced along the cutting edge.

2 Claims, 11 Drawing Figures

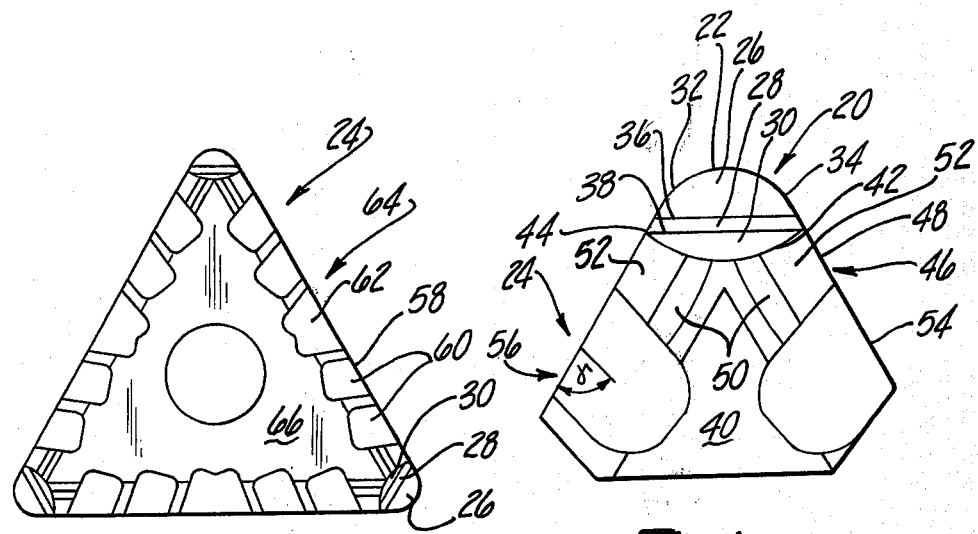
Fig-1
Fig-1A
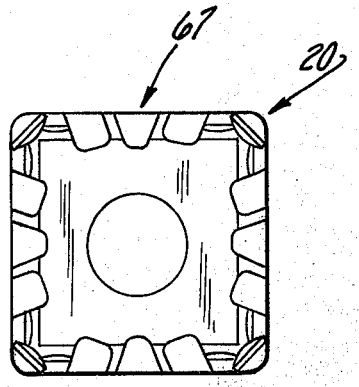
Fig-2
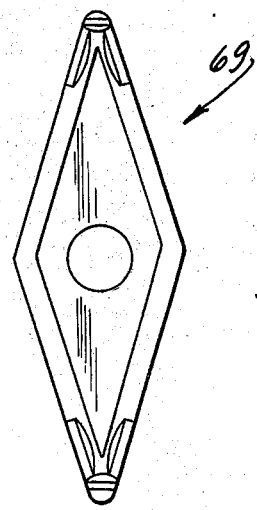
Fig-3

METALCUTTING INSERT FOR ROUGHING AND FINISHING

BACKGROUND OF THE INVENTION

When conventional cemented carbide inserts are used for machining of some metals, a continuous chip is formed which interferes with the machining process and often mars the finished surface of the part. This problem is somewhat alleviated when so called "chipbreaker" inserts are used. In these inserts, strategically placed chipbreaking surfaces are formed in the rake face of the insert usually by molding the green carbide before it is sintered, but sometimes also by grinding after sintering. Various combinations of depressions and protrusions have been used in efforts to insure that the resulting chipbreaking surfaces on the insert will radically deform the chip over wide ranges of speeds and feeds, thus stiffening it so that it is easily broken. Surfaces have been formed in various combinations so that the chip will be bent, curved, thickened, bowed or otherwise shaped to achieve ends which are thought to be desirable, however, a need has remained for an insert which will achieve good chipbreaking over a continuous range of cuts ranging from roughing to finishing while directing the chip away from the workpiece.

SUMMARY OF THE INVENTION

The insert of the present invention achieves chipbreaking action over a wide range by providing a tool for cutting chip forming materials having a cutting corner defined by a chipbreaker surface and the intersection of two sidewalls wherein a plurality of chipbreaking depressions is formed in said chipbreaker surface closely proximate to said cutting corner, including; a first chipbreaking depression closely adjacent to said cutting corner, having a concave rear chip interrupting surface substantially normal to the bisector plane defined by said sidewalls; and a pair of second chipbreaking depressions located adjacent to said first chipbreaking depression, next adjacent to said cutting corner, each having a chip interrupting surface substantially locally parallel to the cutting edge defined by the intersection of its respective sidewall and the chipbreaker surface, each said chip interrupting surface being spaced from its respective sidewall by a distance of from about 0.020 inches to about 0.040 inches. In a preferred embodiment the chipbreaking action is extended still further from the cutting corner by a plurality of cylindrical chip corrugating and directing depressions spaced along the cutting edge, the longitudinal axes of these depressions intersecting the cutting edge at an acute angle so that the chip will be corrugated and deflected away from the finished surface of the workpiece.

BRIEF DESCRIPTION OF THE DRAWINGS

FIG. 1 is a plan view of an indexable triangular insert of the present invention.

FIG. 1-A is an enlarged view of a corner of an insert of the present invention.

FIGS. 2 and 3 are plan views of other shapes of indexable inserts of the present invention.

DESCRIPTION OF THE PREFERRED EMBODIMENT

Figure 4:
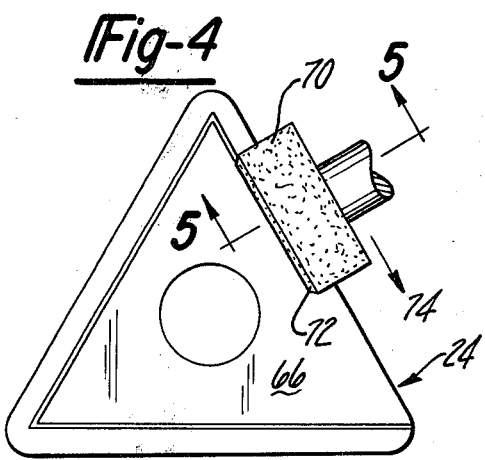
FIG. 4 is a plan view of a triangular insert which is being ground to form an edge protecting island in the center of the insert.

In FIG. 1, finishing chipbreaking depression 20 is formed adjacent corner 22 of triangular insert 24. Finishing chipbreaking depression 20 is formed with three sections; increasing depth section 26; cylindrical section 28 and decreasing depth section 30. Increasing depth section 26 is bounded by curve 32 defining the intersection of the surface of increasing depth section 26 with cutting edge 34. Curve 32 coincides locally with cutting corner 22 and cutting edge 34. Cylindrical surface 28 is separated from increasing depth section 26 by line 36 which is substantially perpendicular to the bisector of cutting corner 22. The demarcation between cylindrical surface 28 and decreasing depth portion 30 is line 38 which is also substantially perpendicular to the bisector of cutting corner 22. Preferably, the lower surfaces of both increasing depth portion 26 and decreasing depth portion 30 are conical surfaces wherein the axes of the cones coincide with each other and lie in the bisector plane of cutting corner 22 but are spaced above rake surface 40 of insert 24. The demarcation between decreasing depth portion 30 and rake surface 40 is curve 42. Decreasing depth portion 30 is concave away from cutting corner 22 so that chips leaving cutting corner 22 forward of point 44 along cutting edge 34 will impinge upon decreasing depth portion 30 at an angle which is approximately perpendicular to that surface. In operation, as cuts varying from very light finishing cuts to medium finishing cuts are taken, the chip will leave cutting edge 34 at a point varying from cutting corner 22 to point 44 and consequently will impinge approximately perpendicularly upon decreasing depth portion 30 and thus be directed away from the workpiece even though extremely ductile materials may not be completely broken at very light feeds. The width of increasing depth portion 26 along the bisector of cutting corner 22 is preferably between about 0.030 and about 0.050 inch, while the width of cylindrical portion 28 is preferably between about 0.010 and about 0.015 inch, the width of decreasing depth portion 30 is between about 0.015 and about 0.025 in. The depth of cylindrical surface 28 below cutting edge 34 is preferably between about 0.008 and 0.012 inch.

Cuts which are heavier than medium finishing cuts are broken by parallel chipbreaking grooves 46 formed along cutting edge 48. Parallel chipbreaking grooves 46 intersect cutting edge 48 without a land and are defined by inner conical surfaces 50 and outer conical surfaces 52. Inner conical surface 50 preferably defines an angle α with rake surface 40 of insert 24 of between about 36° and 40°. Outer conical surface 52 preferably forms an angle β of between about 10° and 14° with rake face 40. The width of outer conical surface 52 is preferably between about 0.025 and about 0.035 in. while the width of inner conical surface 50 is preferably between about 0.010 and about 0.015 in. The total width of parallel chipbreaking groove 46 is preferably between about 0.040 and about 0.050 in. The length of parallel chipbreaking groove 46 as measured along cutting edge 48 is preferably between about 0.045 and about 0.055 in. Parallel chipbreaking groove 46 extends from finishing depression 20 to first corrugating and deflecting depression 56.

As cuts heavier than medium finishing cuts are taken, larger portions of the chip will impinge upon inner conical surface 50. First chip corrugating and deflecting depression 56 preferably forms a portion of the surface of a cylinder wherein the intersection of the periphery with the circular ends of the cylinder has a radius of curvature of between about 0.025 and about 0.035 in. The radius of curvature of the peripheral cylindrical surface is preferably between about 0.095 and about 0.105 in. The depth of chip corrugating and deflecting grooves 56 is between about 0.013 and about 0.017 in. while the longitudinal axis of groove 56 forms an angle $\gamma$ with cutting edge 48 of between about 65° and about 75°. Second chip corrugating and deflecting depression 58 is spaced from first depression 56 by a distance of between about 0.015 and about 0.025 in. but otherwise is similarly shaped. Nadirs 60 of grooves 56 and 58 are located between about 0.013 and about 0.017 in. below rake surface 40 of insert 24. Each nadir 60 is spaced from cutting edge 48 by a distance of between about 0.010 and about 0.020 in. Successive chip corrugating and deflecting grooves 62 are formed along cutting edge 48. Depression 64 is the intersection of two such grooves. It is important to note that the dimensions given for each depression to not vary with the size of the insert but rather as the size of the insert is increased, only the number of successive chip corrugating and deflecting grooves is increased. Thus the corner shape and size is the same regardless of the size of the insert.

Center 66 of insert 24 is raised slightly above cutting edges 34 and 48 so that cutting edges 34 and 48 are protected if inserts are stacked or placed upon hard surfaces prior to use.

In FIG. 2, depressions having corresponding numbers serve the same functions and have the same size as in FIG. 1. Thus, square insert 67 of FIG. 2 is essentially the same as triangle 24 of FIG. 1 except that the shape of finishing depression 20 is modified to span 90° instead of 60°.

FIG. 3 illustrates a tracing insert 69 of the present invention wherein the chip corrugating and deflecting depressions are omitted since this type of insert is principally used for light depths of cut.

FIGS. 4 through 10 are provided to illustrate the shape of the various depressions formed in the inserts of the present invention by demonstrating how each depression would be formed if small diamond grinding wheels were used to form each depression in the rake face of a planar triangular insert. Of course, it is to be understood that while the method shown in FIGS. 4–10 could be used for forming small numbers of inserts; in high production situations, dies would be used to press the desired shapes into the green carbide before sintering. However, the die would simply be the negative of the rake face of the insert described in FIGS. 4 through 10.

Figure 5:
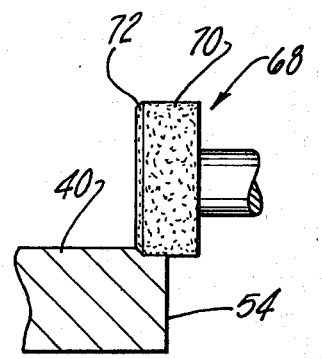
FIG. 5 is a sectional view along line 5—5 in FIG. 4 illustrating the shape of the wheel used to form the edge protecting island.

FIGS. 4 and 5 illustrate the shape of chamfered wheel 68 used to form edge protecting island 66 on insert 24. Wheel 68 has cylindrical portion 70 and chamfered end portion 72. Edge protecting island 66 is formed by feeding wheel 68 in the direction of arrow 74 parallel to each edge of insert 24, while the axis of rotation of cylindrical portion 70 is maintained parallel to rake face 40.

Figure 6:
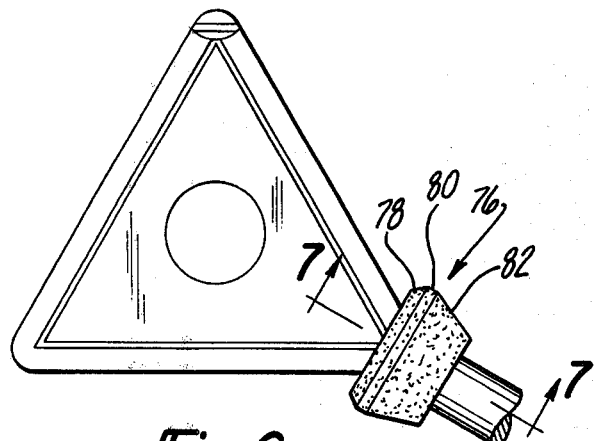
FIG. 6 is a plan view of a triangular insert which is having a chipbreaking depression ground adjacent its corner.
Figure 7:
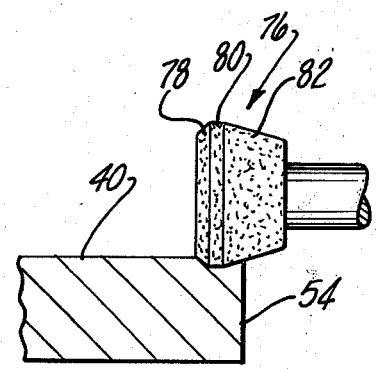
FIG. 7 is a sectional view along line 7—7 in FIG. 6 illustrating the shape of the wheel used to grind the finishing depression in the corners.

FIGS. 6 and 7 illustrate the formation of finishing depression 20 using wheel 76 having conical end portion 78, cylindrical middle portion 80 and conical inner portion 82. Finishing depression 20 is formed by moving wheel 76 downward in the direction normal to rake face 40 of insert 24, while the axis of wheel 76 is maintained parallel to the bisector of corner 22 and parallel to rake face 40 of insert 24.

Figure 8:
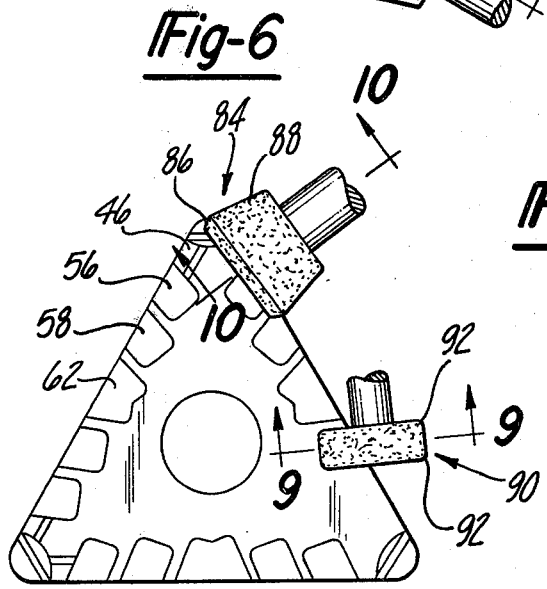
FIGS. 8–10 illustrate the processes for grinding in the chip corrugating and deflecting surfaces as well as the parallel chipbreaking depressions which are adjacent the corners.
Figure 9:
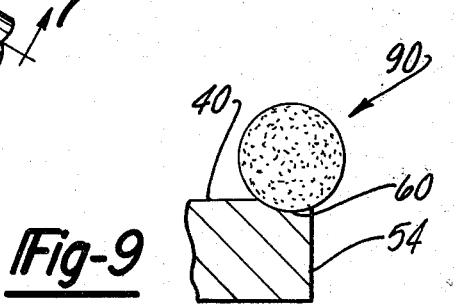
Figure 10:
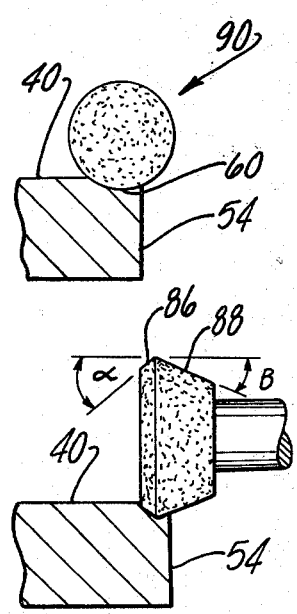

FIGS. 8, 9, and 10 illustrate the formation of parallel chipbreaking grooves 46 and chip corrugating and deflecting grooves 56, 58, and 62. Parallel chipbreaking grooves 46 are formed using double conical wheels 84 having frusto-conical end portion 86 and frustro-conical inner portion 88. The axis of double conical wheel 84 is maintained parallel to rake face 40 of insert 24 and perpendicular to flank 54 while it is moved downward perpendicular to rake face 40. Chip corrugating and deflecting grooves 56, 58, and 62 are formed using cylindrical wheel 90 having radiused end portions 92. The axis of rotation of cylindrical wheel 90 is parallel to rake face 40 and so placed that the longitudinal axis of each groove 56, 58, or 62 will make an angle $\gamma$ of between about 65° and about 75° with cutting edge 48 as shown in FIG. 1-A.

As my invention, I claim:

1. A tool for cutting chip forming materials having a cutting corner defined by a chipbreaker surface and the intersection of two sidewalls wherein a plurality of chipbreaking depressions is formed in said chipbreaker surface closely proximate to said cutting corner, including; a first chipbreaking depression closely adjacent to and intersecting said cutting corner, having a concave rear chip interrupting surface substantially normal to the bisector plane devined by said sidewalls; and a pair of second chipbreaking depressions located adjacent to said first chipbreaking depression, next adjacent to said cutting corner, each having a conical chip interrupting surface substantially locally parallel to the cutting edge defined by the intersection of its respective sidewall and the chipbreaker surface, each said conical chip interrupting surface being spaced from its respective sidewall by a distance of from about 0.020 inches to about 0.040 inches.

2. The tool of claim 1, wherein a further plurality of chipbreaking depressions are formed into the chipbreaking surface, including a plurality of cylindrical chip corrugating and directing depressions spaced along the intersection of each sidewall and the chipbreaker surface, the longitudinal axis of these depressions intersecting the cutting edge at an acute angle.

* * * * *